(12) United States Patent
Coolens et al.

(10) Patent No.: US 10,550,743 B2
(45) Date of Patent: Feb. 4, 2020

(54) CYLINDER HEAD COVER AND METHOD FOR PRODUCING A CYLINDER HEAD COVER

(71) Applicant: ElringKlinger AG, Dettingen (DE)

(72) Inventors: Holger Coolens, Tuebingen (DE); Christian Czermin, Guenzburg (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 15/900,509

(22) Filed: Feb. 20, 2018

(65) Prior Publication Data

US 2018/0171841 A1 Jun. 21, 2018

Related U.S. Application Data

(63) Continuation of application No. PCT/EP2016/070994, filed on Sep. 6, 2016.

(30) Foreign Application Priority Data

Sep. 8, 2015 (DE) .................. 10 2015 217 153

(51) Int. Cl.
*F01M 13/04* (2006.01)
*F02F 7/00* (2006.01)
(Continued)

(52) U.S. Cl.
CPC ......... *F01M 13/0416* (2013.01); *B01D 45/08* (2013.01); *B01D 46/00* (2013.01);
(Continued)

(58) Field of Classification Search
CPC ............. F02M 35/10222; F02M 26/41; F02M 35/10354; F02B 2275/02; F02F 1/24; F02F 7/0036; F02F 11/002; F02F 1/00
See application file for complete search history.

(56) References Cited

U.S. PATENT DOCUMENTS 8,152,884 B1 4/2012 Severance et al.
8,915,237 B2 12/2014 Copley et al.
(Continued)

FOREIGN PATENT DOCUMENTS

EP 2 146 061 4/2011
WO WO 2013/017832 2/2013
(Continued)

*Primary Examiner* — Long T Tran
(74) *Attorney, Agent, or Firm* — Womble Bond Dickinson (US) LLP

(57) ABSTRACT

The invention relates to a cylinder head cover for an internal combustion engine which has, in addition to the mere covering function, additional integrated functions, wherein the cylinder head cover according to the invention includes the following: a cover body, which, when the cylinder head cover is assembled, is mounted on an engine block of the internal combustion engine and covers a cylinder head of the internal combustion engine; a separator, through which a raw gas stream can be conducted for the purpose of cleaning, the separator being at least partially formed and/or delimited by the cover body; and/or a valve device, which is at least partially formed and/or delimited by the cover body; wherein the cylinder head cover includes a nozzle device which is integrated in the separator and/or the valve device.

14 Claims, 11 Drawing Sheets

(51) Int. Cl.
*B01D 45/08* (2006.01)
*B01D 46/00* (2006.01)
*F01M 13/02* (2006.01)
*F04F 5/20* (2006.01)
*F04F 5/46* (2006.01)

(52) U.S. Cl.
CPC ........... *F01M 13/021* (2013.01); *F02F 7/006* (2013.01); *F04F 5/20* (2013.01); *F04F 5/46* (2013.01); *F01M 2013/026* (2013.01); *F02F 2200/00* (2013.01)

(56) References Cited

U.S. PATENT DOCUMENTS

| 2009/0193972 | A1* | 8/2009 | Schwandt | B01D 19/0031 95/247 |
|---|---|---|---|---|
| 2010/0180854 | A1* | 7/2010 | Baumann | B04B 5/005 123/196 A |
| 2010/0307466 | A1 | 12/2010 | Ruppel et al. | |
| 2011/0073082 | A1* | 3/2011 | Hattori | F01M 13/022 123/574 |
| 2015/0052862 | A1 | 2/2015 | Wakabayashi | |
| 2015/0159596 | A1 | 6/2015 | Wakiya | |
| 2015/0240732 | A1 | 8/2015 | Makihara | |
| 2015/0247432 | A1 | 9/2015 | Fujikawa | |
| 2015/0292374 | A1* | 10/2015 | Kira | F01M 13/0011 123/574 |
| 2015/0337698 | A1* | 11/2015 | Ruppel | F01M 13/04 123/41.86 |
| 2015/0354420 | A1* | 12/2015 | Kira | F02F 7/006 123/574 |
| 2016/0363017 | A1* | 12/2016 | Nagai | F01M 13/0011 |

FOREIGN PATENT DOCUMENTS

| WO | WO 2015/018691 | 2/2015 |
|---|---|---|
| WO | WO 2016/135072 | 9/2016 |

* cited by examiner

CYLINDER HEAD COVER AND METHOD FOR PRODUCING A CYLINDER HEAD COVER

CROSS-REFERENCE TO RELATED APPLICATIONS

This application is a continuation of International Application No. PCT/EP2016/070994, filed on Sep. 6, 2016, and claims the benefit of German application No. 10 2015 217 153.1 filed on Sep. 8, 2015, which are incorporated herein by reference in their entirety and for all purposes.

FIELD OF DISCLOSURE

The present invention relates to a cylinder head cover for a combustion engine. Such a cylinder head cover preferably comprises a cover body, which in the assembled state of the cylinder head cover is arranged on an engine block of the combustion engine and covers a cylinder head of the combustion engine. Such a cylinder head cover preferably further comprises a separation device, through which a crude gas stream is able to be fed for the purification thereof, wherein the separation device is, for example, formed and/or bound at least in sections by the cover body. Alternatively or in addition to such a separation device, a valve device may be provided, which is in particular formed and/or bound at least in sections by the cover body.

BACKGROUND

Separation devices, in particular oil separators for combustion engines, are disclosed, for example, in WO 2015/018691 A1 or in U.S. Pat. No. 8,915,237 B2.

SUMMARY OF THE INVENTION

The object underlying the present invention is to provide a cylinder head cover for a combustion engine, which has other integrated functions in addition to the mere covering function.

This object is achieved by a cylinder head cover for a combustion engine, which comprises the following:

a cover body, which in the assembled state of the cylinder head cover is arranged on an engine block of the combustion engine and covers a cylinder head of the combustion engine;

a separation device, through which a crude gas stream is able to fed for the purification thereof, wherein the separation device is formed and/or bound at least in sections by the cover body, and/or a valve device, which is formed and/or bound at least in sections by the cover body, wherein the cylinder head cover comprises a nozzle device, which is integrated into the separation device and/or into the valve device.

Therein that the cylinder head cover comprises according to the invention a nozzle device, which is integrated into the separation device and/or into the valve device, the cylinder head cover preferably has at least one other function in addition to the mere covering function. In particular, a more space-efficient and cost-efficient construction of a combustion engine may thus be achieved.

The nozzle device preferably comprises a suction jet nozzle, by means of which a gas stream may be drawn up and/or removed.

The suction jet nozzle preferably comprises a drive nozzle, to which a drive medium, in particular charge air, is able to be supplied for the production of a suction effect for drawing up the gas stream.

In particular, provision may be made for the drive medium, for example charge air, to be able to be fed through the drive nozzle in order to produce a suction effect for drawing up the gas stream.

The drive medium, in particular the charge air, is preferably that medium which is able to be supplied to a combustion chamber of the combustion engine, in particular after passing through a compression device for increasing pressure.

It may be advantageous if the gas stream is the crude gas stream fed through the separation device.

The gas stream is preferably crankcase exhaust gas, that is, in particular contaminated gas from a crankcase of the combustion engine.

By drawing up the gas stream by means of the nozzle device, a crankcase ventilation of the combustion engine is preferably achievable.

In an embodiment of the invention, provision may be made for the suction jet nozzle to comprise a suction section, into which preferably a drive nozzle of the suction jet nozzle and/or a gas stream supply flow.

In particular, the drive nozzle and the gas stream supply are arranged on a common inlet side of the suction section.

By means of the gas stream supply, the gas stream to be drawn up and/or removed by means of the nozzle device is preferably able to be supplied to the suction section.

Provision may be made for the suction section, seen along a flow direction, to comprise a tapering section, a cylinder section, and/or an enlarging section.

The flow direction is thereby in particular the flow direction of the drive medium fed through the drive nozzle and/or flowing out of the drive nozzle. Further, the flow direction is preferably also the flow direction of the drive medium and/or of the drawn up gas stream in the suction section.

The tapering section of the suction section is preferably a section of the suction section following the gas stream supply and/or the drive nozzle, in particular with respect to the flow direction.

In particular via the combination of the drive nozzle and the tapering section of the suction section, a suction effect preferably arises in the vicinity of the drive nozzle when drive medium flows out of the drive nozzle into the tapering section.

The drive nozzle and the tapering section, in particular the entire suction section, are preferably arranged substantially coaxially to each other.

The drive nozzle and the suction section, in particular the tapering section, the cylinder section, and/or the enlarging section, are preferably formed rotationally symmetrically.

In particular an inner contour of the suction section is preferably formed substantially rotationally symmetrically.

The suction section and the drive nozzle are preferably arranged at least approximately coaxially to each other, wherein a common middle axis is preferably a common axis of rotation. It may be favorable if the gas stream supply flows at least approximately annularly into the suction section.

The gas stream supply preferably surrounds the drive nozzle approximately annularly.

Gas to be drawn up is preferably able to flow annularly around the drive nozzle by means of the gas stream supply.

It may be advantageous if the suction section is formed at least bipartite.

An outer part with respect to a radial direction is thereby preferably formed by a housing component of the separation device and/or by a housing component of the valve device and/or by the cover body.

A housing component is, for example, a cover element.

In particular, provision may be made for an outer part of the suction section with respect to a radial direction to be formed by a common housing component of the separation device as well as of the valve device.

The outer part with respect to a radial direction is preferably a substantially cylinder-shaped tube, for example a connection nozzle, of the cylinder head cover.

It may be advantageous if the suction section is formed at least bipartite, wherein an inner part with respect to a radial direction is formed by an insertion element, which in particular is insertable into an outer part of the suction section with respect to a radial direction.

The inner part and the outer part are preferably connectable to each other by means of a detent connection and/or a clip connection, in particular fixable relative to each other with respect to an insertion direction or slotting direction of the insertion element.

The insertion element preferably has a substantially constant outer cross section along a flow direction and/or a varying inner cross section along a flow direction.

The insertion element is preferably stably and reliably receivable and/or fixable in a substantially cylindrical element.

At the same time, a flow variation region is preferably created by means of the insertion element.

The insertion element preferably forms a flow constriction point for producing and/or optimizing a suction effect of the suction jet nozzle of the nozzle device.

A tapering section, a cylinder section, and/or an enlarging section of the suction section are preferably formed by the insertion element.

The insertion element is preferably integrally formed.

In particular, provision may be made for the insertion element to be formed as a plastic component, in particular as an injection molding plastic component.

It may be advantageous if the insertion element comprises a detent device, in particular one or more detent elements, for fixing the insertion element to an outer part of the at least bipartite suction section.

The insertion element is preferably integrally formed and preferably comprises the one or more detent elements in addition to the tapering section, the cylinder section, and/or the enlarging section.

In an embodiment of the invention, provision may be made for the cover body, a cover element of the separation device, a cover element of the valve device, a suction section of the nozzle device, and/or a drive nozzle of the nozzle device to be formed by one or more plastic components, in particular injection molding plastic components.

In particular, provision may be made for an outer part of the suction section to be formed integrally with the cover body or with a cover element as an injection molding plastic component.

The valve device preferably comprises a pressure-regulating valve.

A volumetric flow of the gas stream to be removed via the nozzle device is preferably able to be regulated by means of the pressure-regulating valve, in particular depending on a pressure difference between the pressure in an interior space of the combustion engine containing the gas stream to be removed, on the one hand, and the ambient pressure of the combustion engine on the other.

In an embodiment of the invention, provision may be made for the separation device to comprise one or more separation chambers, which are bound by the cover body and a cover element of the separation device, wherein the cover body and/or the cover element are preferably each integrally formed and preferably form or bound the following in addition to the one or more separation chambers:

at least one valve chamber for receiving a valve element of the valve device; and/or a gas stream supply of the nozzle device; and/or a drive nozzle of the nozzle device; and/or a drive medium connection of the nozzle device; and/or an outlet connecting piece for removing the drive medium and/or the gas stream.

An ejector for an efficient crankcase exhaust gas removal is preferably formed by means of the nozzle device.

The separation device is preferably an oil separator, in particular a fine separator.

The present invention further relates to a method for producing a cylinder head cover.

The object underlying the invention with regard to this is to provide a method, by means of which a cylinder head cover is simply producible, which has other functions in addition to a mere covering function.

This object is achieved according to the invention by a method for producing a cylinder head cover, wherein the method comprises the following:

providing a cover body, which in the assembled state of the cylinder head cover is arranged on an engine block of the combustion engine and covers a cylinder head of the combustion engine;

providing and arranging a cover element on the cover body for forming at least one separation chamber of a separation device and/or at least one valve chamber of a valve device, wherein the cover body and/or the cover element comprise or form at least one section of the nozzle device.

The method according to the invention preferably has individual or multiple features and/or advantages described in connection with the cylinder head cover according to the invention.

The cylinder head cover according to the invention is preferably producible by carrying out the method according to the invention.

Further, the cylinder head cover according to the invention and/or the method according to the invention may have individual or multiple features and/or advantages subsequently described:

The nozzle device preferably serves for vacuum-supported crankcase ventilation and/or for efficient oil separation.

The nozzle device may preferably be provided alternatively or in addition to an external pump or an external ejector.

The nozzle device of the cylinder head cover according to the invention preferably has no parts movable during operation and/or no electronic components and/or no controls.

By integrating the nozzle device into the cylinder head cover, a particularly compact construction of the entire crankcase ventilation is preferably achievable.

The nozzle device is preferably integrated into the valve device.

In particular, provision may be made for a suction section of the nozzle device to be arranged and/or formed in an outlet connecting piece of the pressure-regulating valve.

The suction section preferably is or comprises a mixing tube, in which the gas stream to be drawn up and/or removed is mixed with the drive medium.

The mixing tube may for example be an insertion element (slotting part) for inserting into the outlet connecting piece of the pressure-regulating valve.

Further, the mixing tube may be formed by suitable shaping of the outlet connecting piece.

The drive nozzle is preferably formed by suitable shaping of the pressure-regulating valve and/or of a cover element.

It may be favorable if the cover element of the separation device forms a section of the separation device as well as of the valve device and/or of the nozzle device.

A drive medium connection, an outlet connecting piece, and a cover element, which bounds one or more separation chambers and/or one or more valve chambers, are preferably formed integrally with each other, for example as an injection molding plastic component.

The nozzle device is preferably arranged at least in sections between the separation device and the valve device.

Additional preferred features and/or advantages of the invention are the subject matter of the subsequent description and the graphic depiction of an embodiment.

BRIEF DESCRIPTION OF THE DRAWINGS

The same or functionally equivalent elements are provided with the same reference numerals in all figures.

DETAILED DESCRIPTION OF THE DRAWINGS

Figure 1:
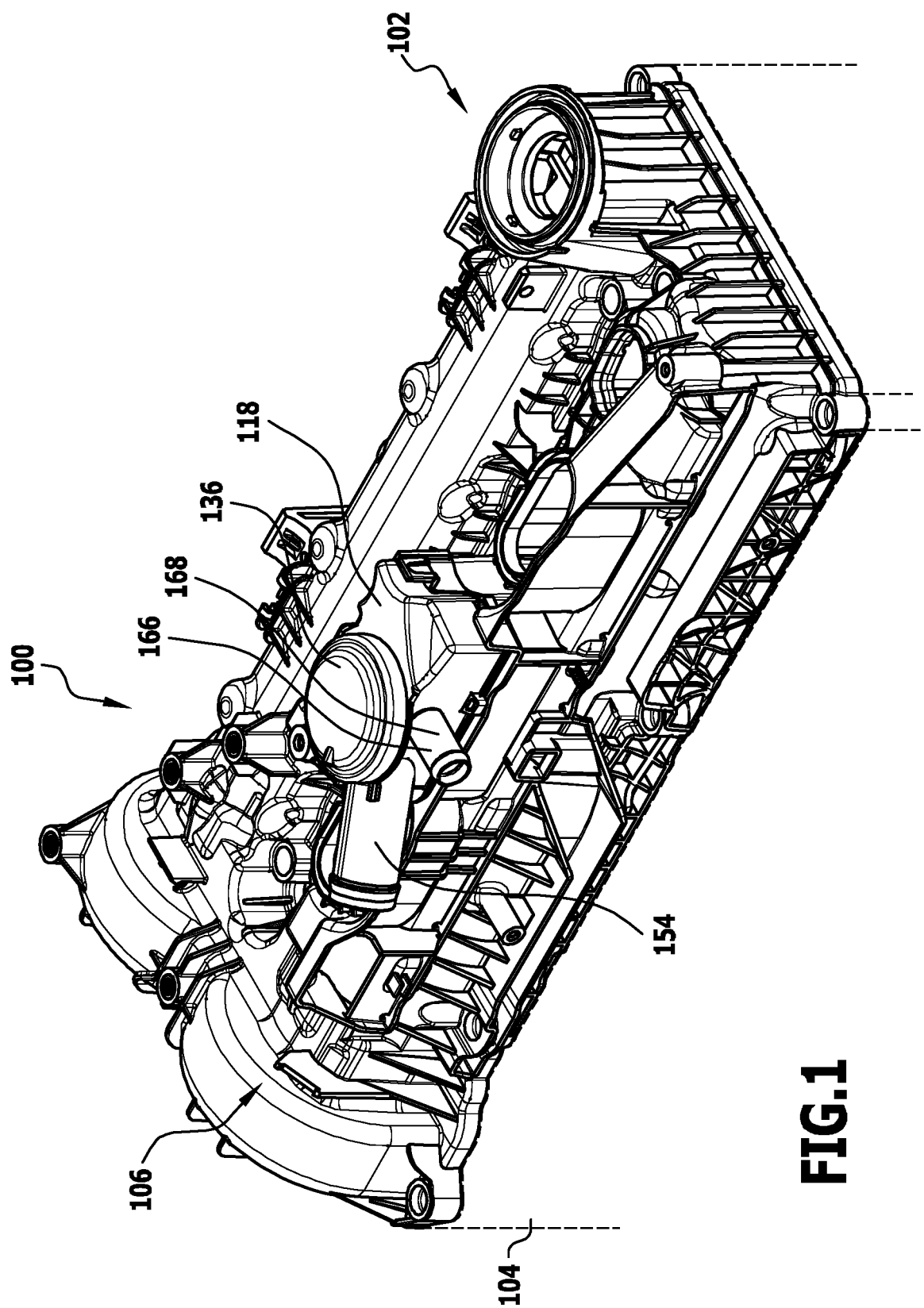
FIG. 1 shows a schematic perspective depiction of a cylinder head cover.
Figure 2:
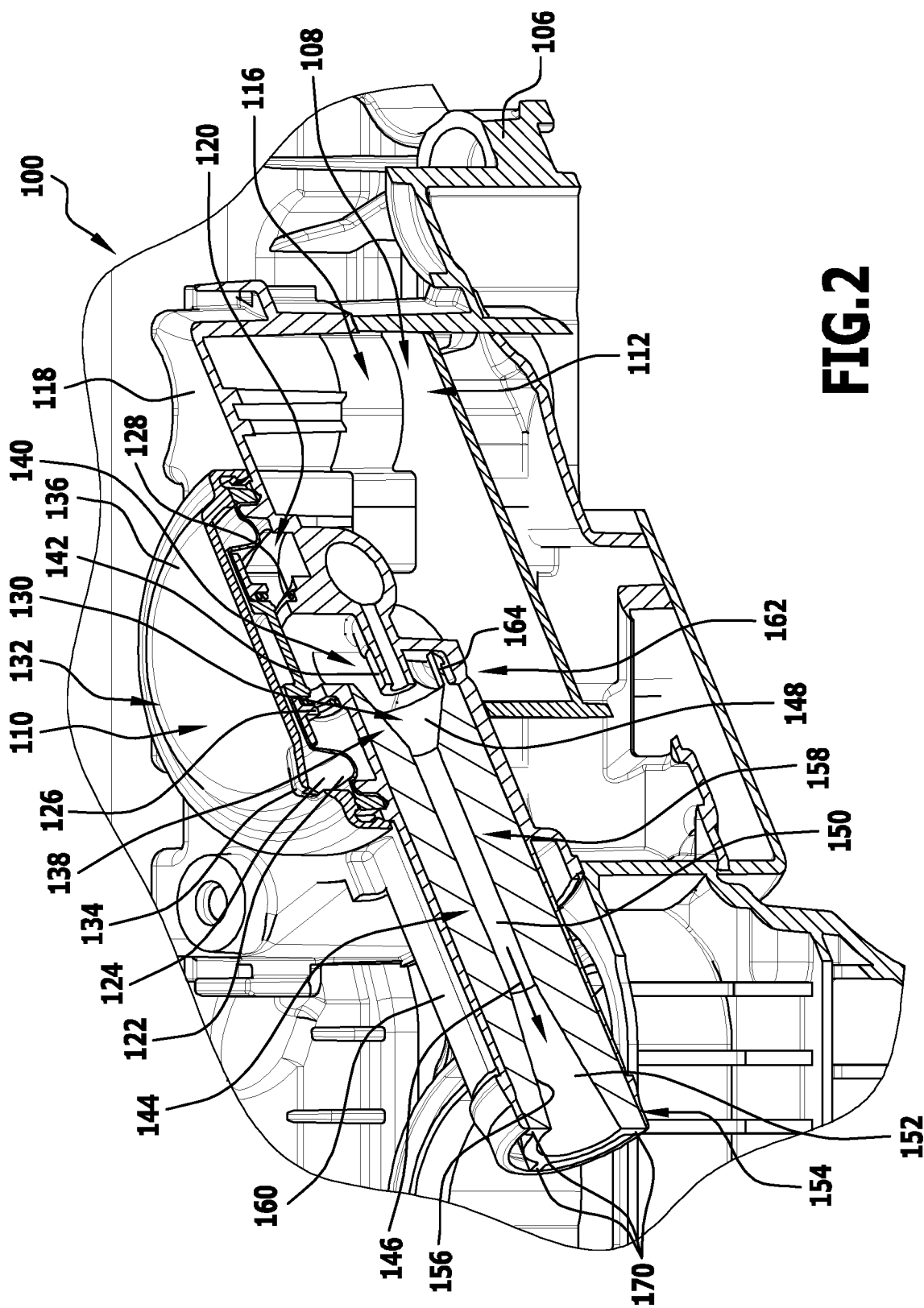
FIG. 2 shows a schematic perspective section through a suction section and a drive nozzle of a nozzle device of the cylinder head cover from FIG. 1.
Figure 3:
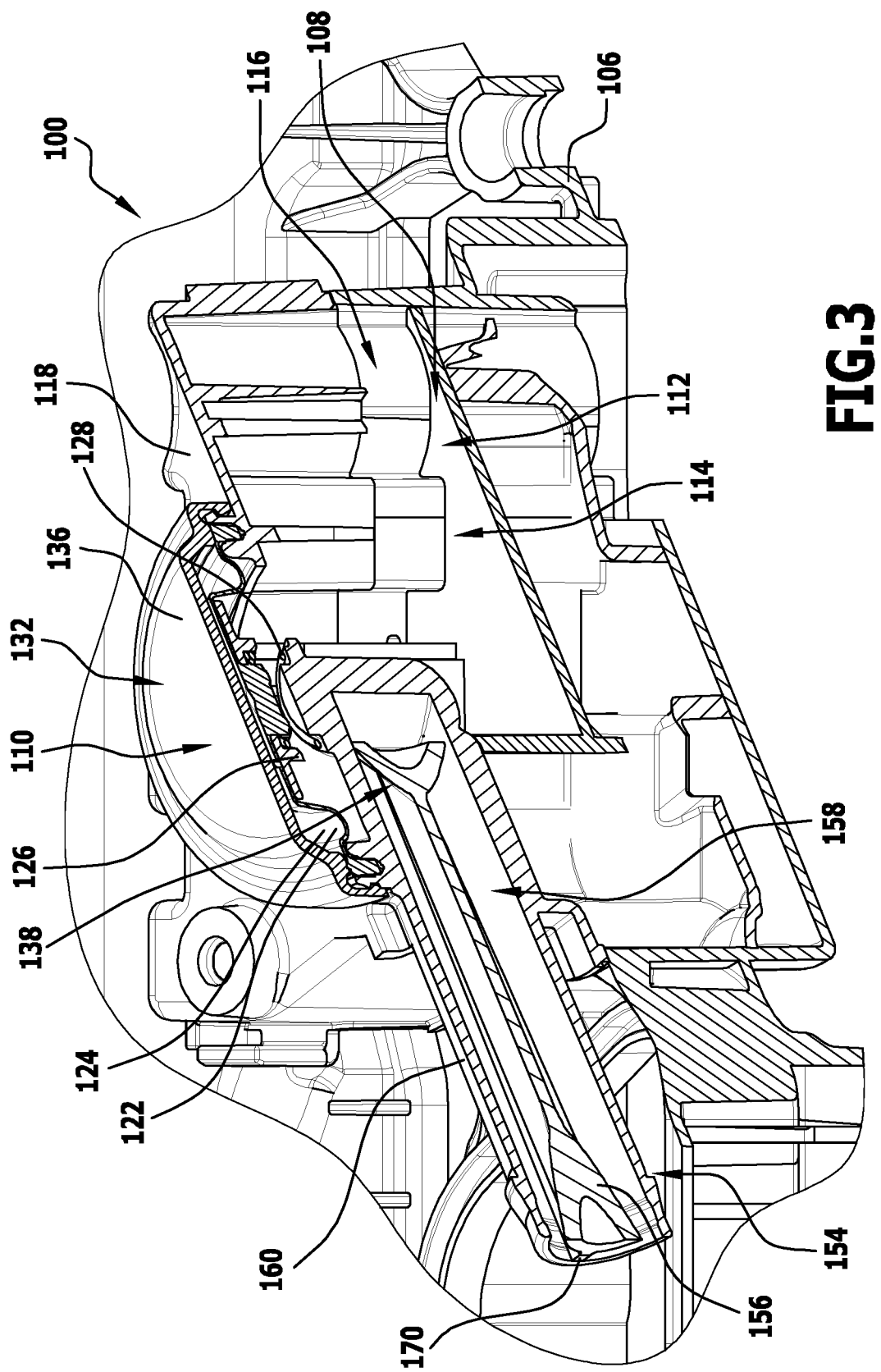
FIG. 3 shows a further schematic perspective section through the nozzle device of the cylinder head cover from FIG. 1.
Figure 4:
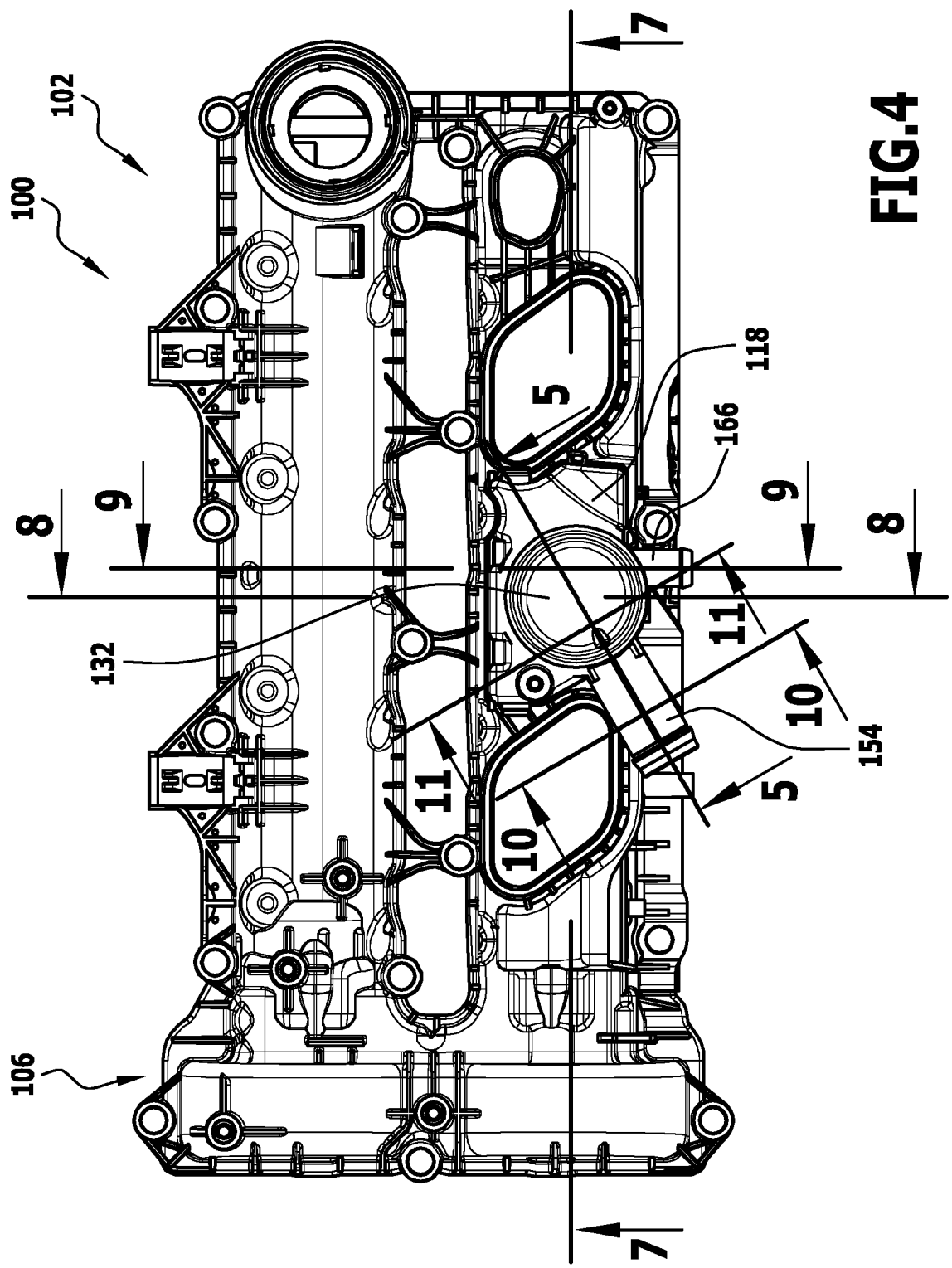
FIG. 4 shows a schematic top-view onto an upper side of the cylinder head cover from FIG. 1
Figure 5:
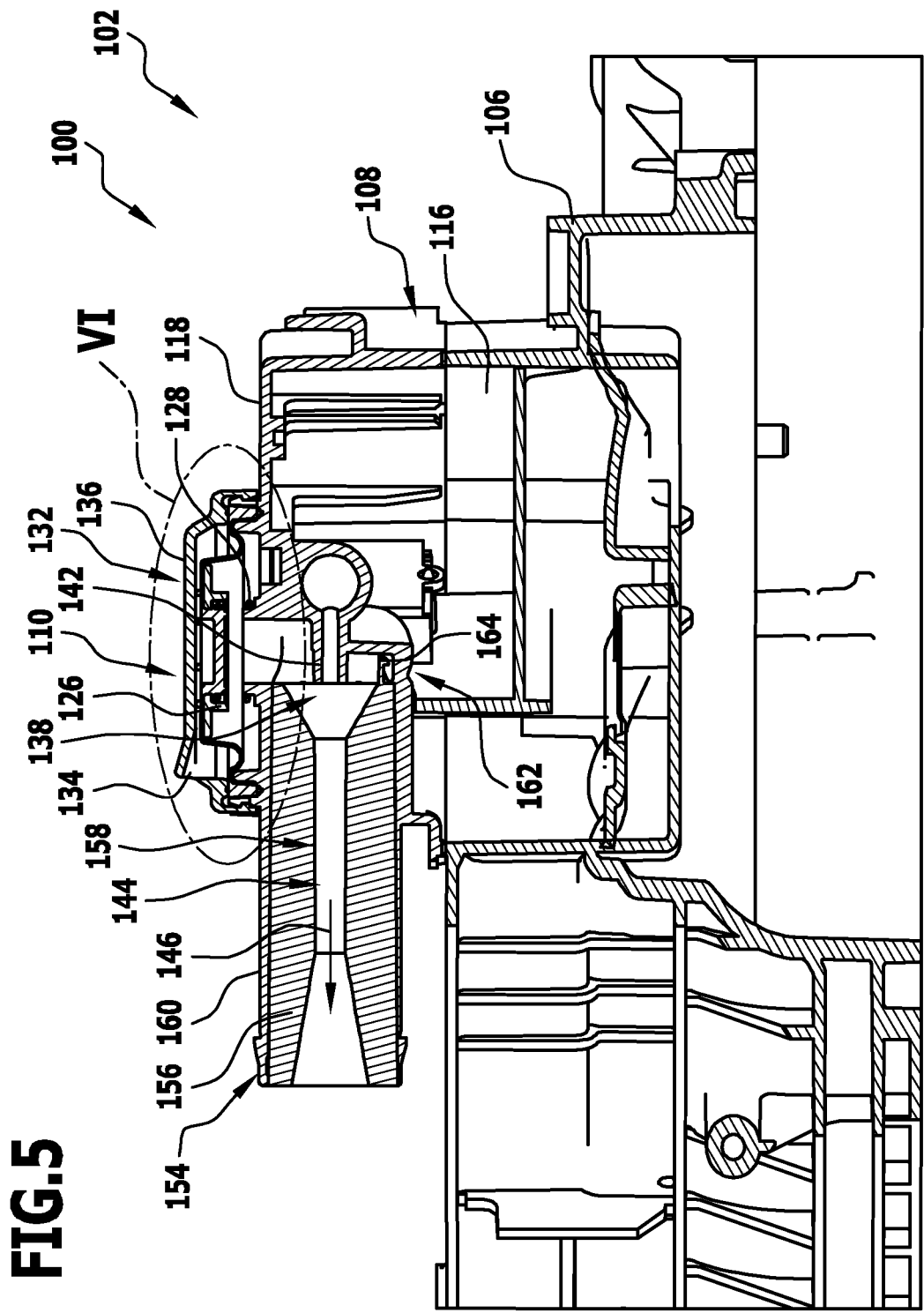
FIG. 5 shows a schematic section along the line 5-5 in FIG. 4.

An embodiment depicted in FIGS. 1 to 11 of a cylinder head cover designated as a whole by 100 is used in particular in a combustion engine 102, for example a vehicle engine.

The cylinder head cover 100 is thereby arranged in particular on a cylinder head 104 of the combustion engine 102, in order to cover the cylinder head 104.

The cylinder head cover 100 may serve in conventional known embodiments in particular exclusively to cover the cylinder head 104.

The cylinder head cover 100 preferably has further functions, however, in particular in order to be able to provide a particularly compact combustion engine 102.

The cylinder head cover 100 according to the embodiment depicted in FIGS. 1 to 11 comprises in particular a cover body 106, which fulfills the function of a conventional cylinder head cover 100 and covers the cylinder head 104.

The cover body 106 is for example a plastic component, for example an injection molding plastic component.

Additionally, the cylinder head cover 100 preferably comprises a separation device 108 and/or a valve device 110.

The separation device 108 is in particular an oil separator 112, for example a fine separator 114, for separating oil, in particular oil droplets, out of a gas stream.

The separation device 108 serves in particular to separate oil out of a crude gas stream, which comes, for example, from the cylinder head 104 and/or a crankcase of the combustion engine 102.

The separation device 108 preferably comprises one or more separation chambers 116, which are provided for example with separating elements, in particular impact separators, filter elements, etc.

The one or more separation chambers 116 are thereby in particular bound on one side by the cover body 106. On the other side, a cover element 118 is provided, which bounds the one or more separation chambers 116.

The one or more separation chambers 116 are preferably formed completely by means of the cover body 106 and the cover element 118.

The cover element 118 is for example a plastic component, in particular an injection molding plastic component.

The cover element 118 is preferably arranged, for example welded, on the cover body 106 on an inner side or outer side of the cover body 106.

In the embodiment of the cylinder head cover 100 depicted in FIGS. 1 to 11, the cover element 118 is arranged on an outer side of the cover body 106.

The separation device 108 comprises an inlet section, through which crude gas to be purified may flow, in particular be drawn up, into the separation device 108.

The separation device further comprises an outlet, through which purified gas may be removed.

The outlet of the separation device 108 is preferably formed by the valve device 110.

Thus, in the embodiment of the cylinder head cover 100 depicted in FIGS. 1 to 11, a gas stream flowing through the separation device 108 may be regulated by means of the valve device 110.

The valve device 110 is preferably formed in sections by the cover element 118 of the separation device 108.

In particular, a valve chamber 120 of the valve device 110 is bound by the cover element 118.

The valve chamber 120 is in particular a space in which a valve element 122, in particular a membrane 124, of the valve device 110 is received or receivable.

The valve device 110 preferably further comprises a support plate 126, with which a spring element 128 of the valve device 110 engages.

The support plate, which is further connected to the membrane 124, is thereby able to be arranged by means of the spring element 128 in an open position at specified pressure ratios. In this open position, a gas stream may in particular flow out of the separation device 108 and be supplied to a gas stream supply 130.

The valve device 110 is thereby formed in particular as a pressure-regulating valve 132, in which an opening or a closing of the valve device 110 automatically occurs due to varying pressure ratios on the two sides of the valve element 122.

One side of the valve element 122 is thereby connected to a vicinity of the cylinder head cover 100 via a reference pressure hole 134 in a pressure-regulating valve cover 136 of the valve device 110, such that the ambient air pressure is constantly being applied on this side of the valve element 122.

The other side of the valve element 122 is fluidically and/or pressure-actively connected to the separation device 108, on the one hand, and to a nozzle device 138 still to be described on the other.

The valve element 122 is thereby in particular movable and able to be put into an open position or closed position in such a way that a fluidic connection between the separation device 108 and the nozzle device 138 is producible or severable.

Figure 6:
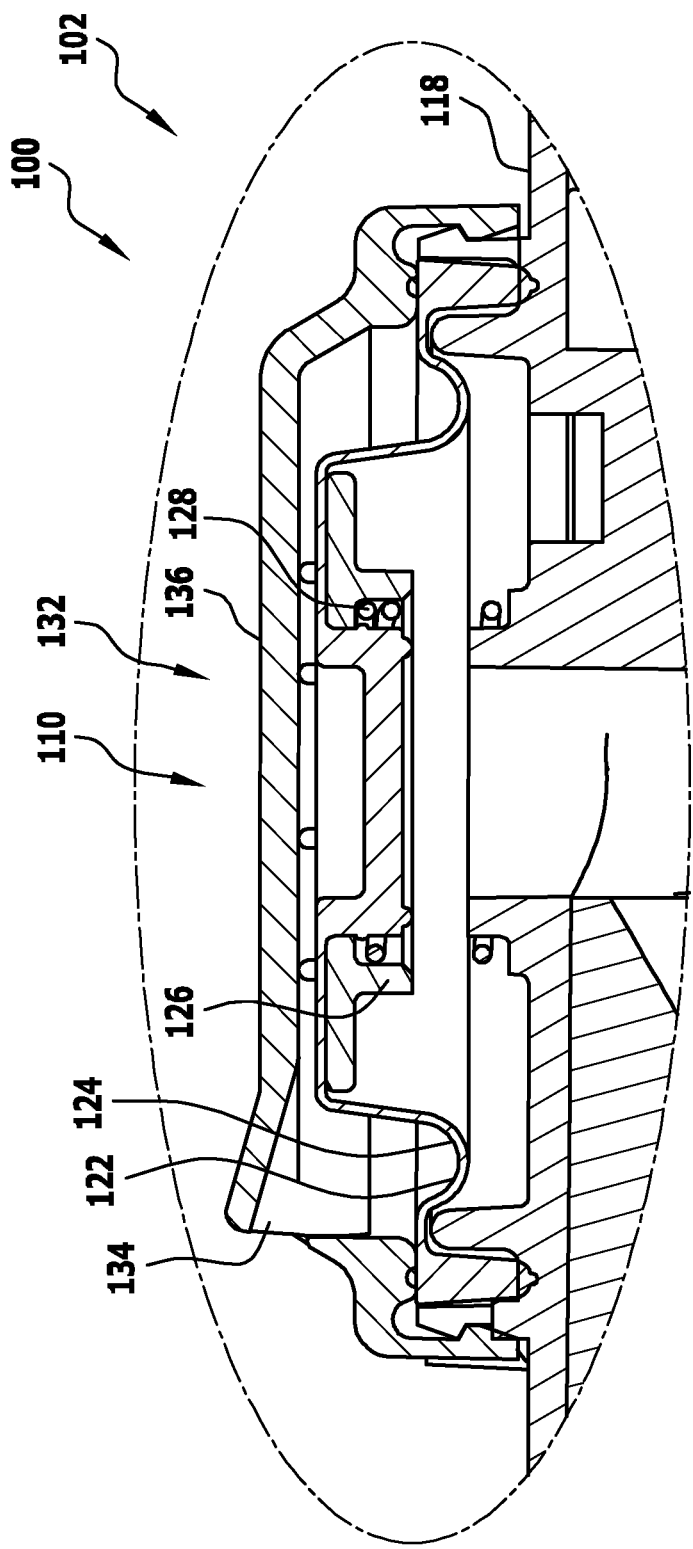
FIG. 6 shows an enlarged depiction of the region VI in FIG. 5.
Figure 7:
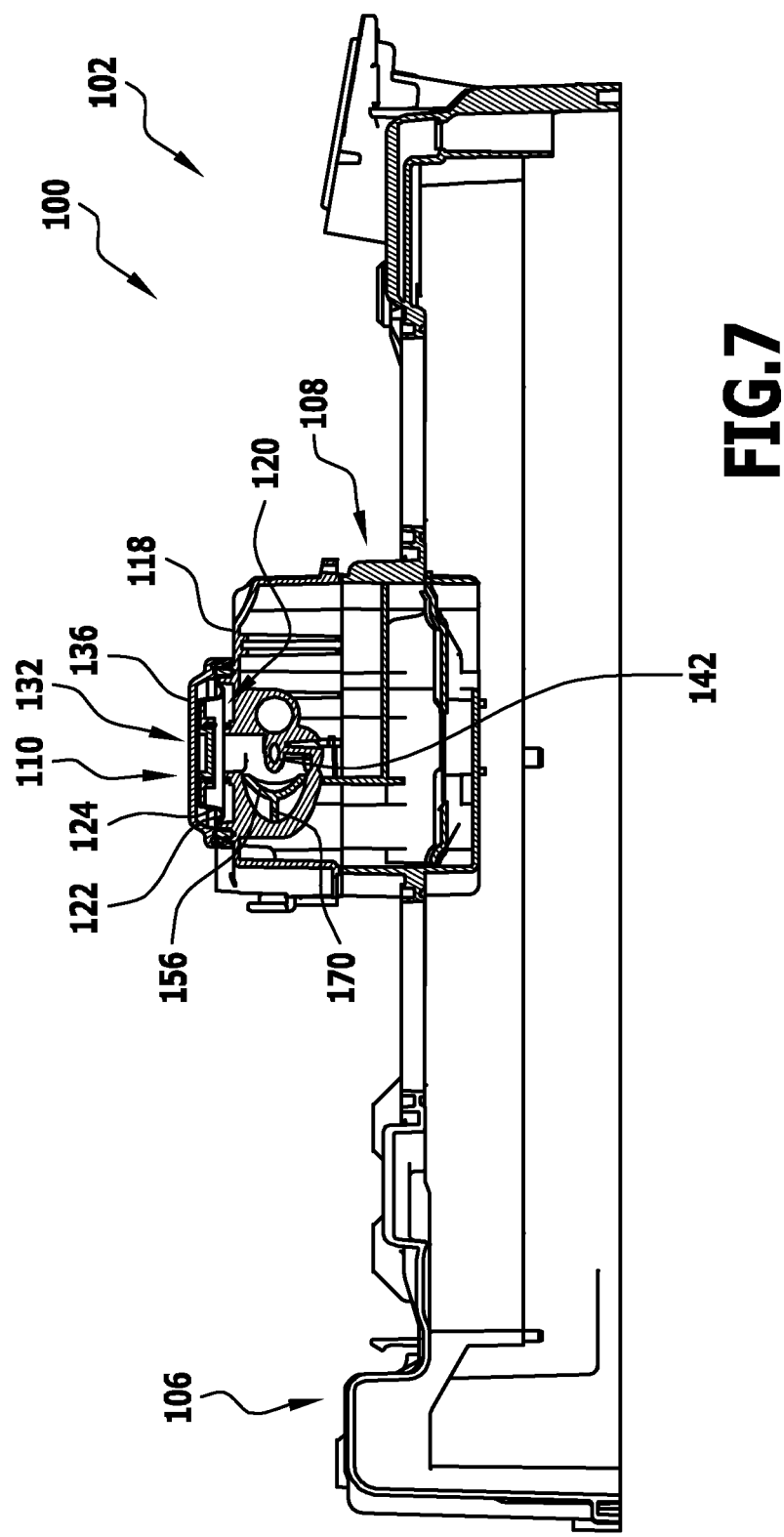
FIG. 7 shows a schematic section along the line 7-7 in FIG. 4.
Figure 8:
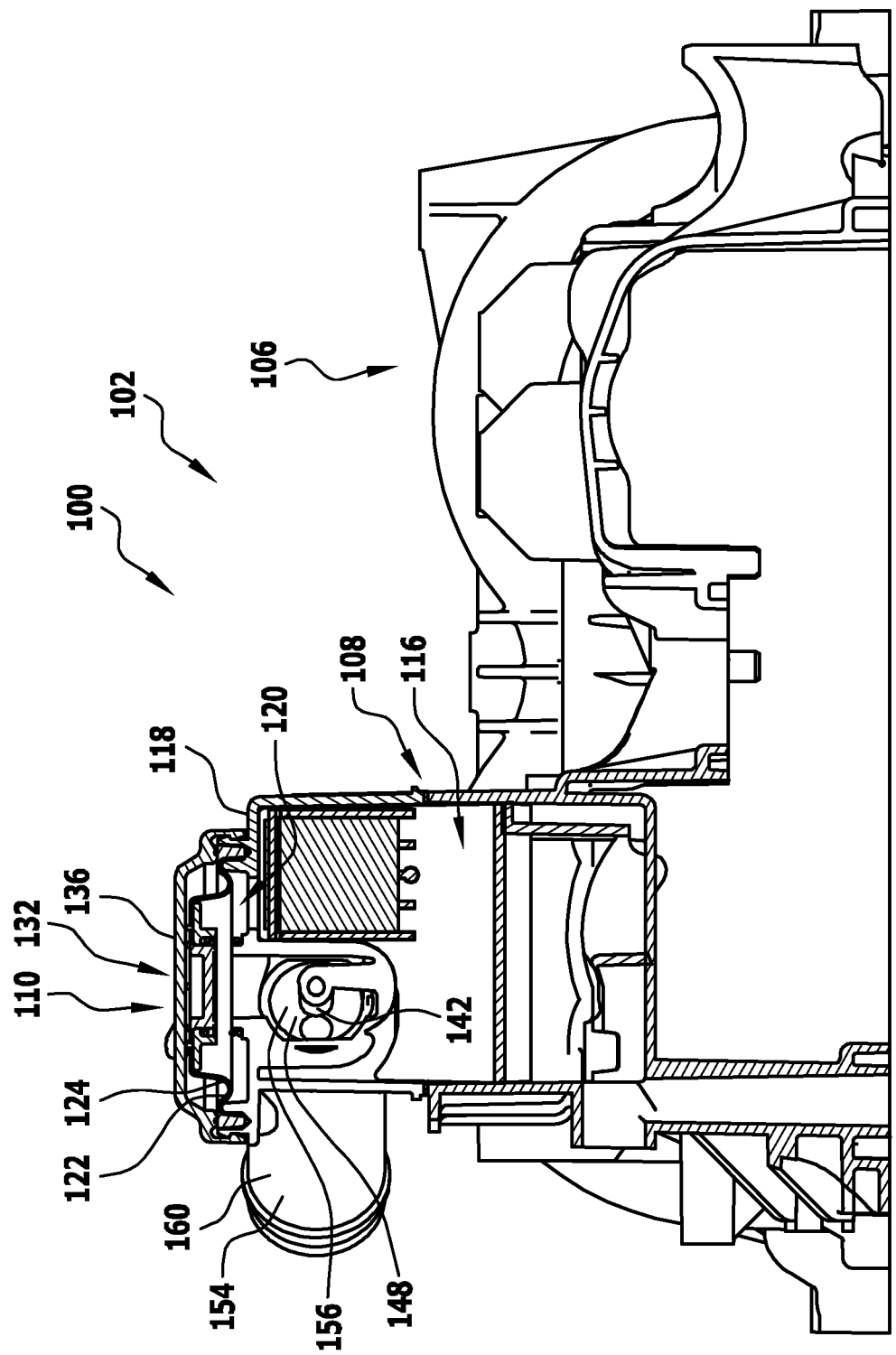
FIG. 8 shows a schematic section along the line 8-8 in FIG. 4.
Figure 9:
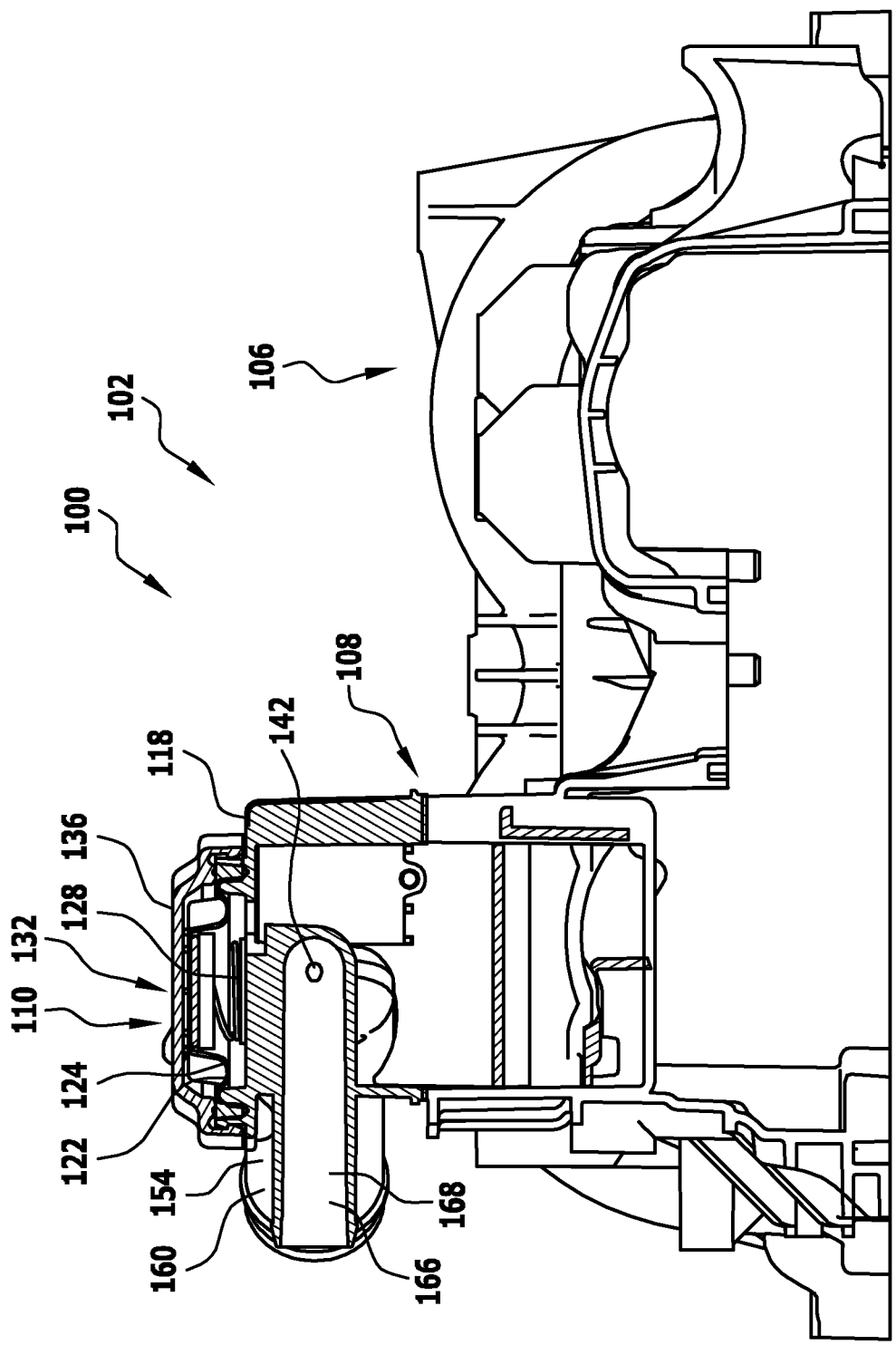
FIG. 9 shows a schematic section along the line 9-9 in FIG. 4.
Figure 10:
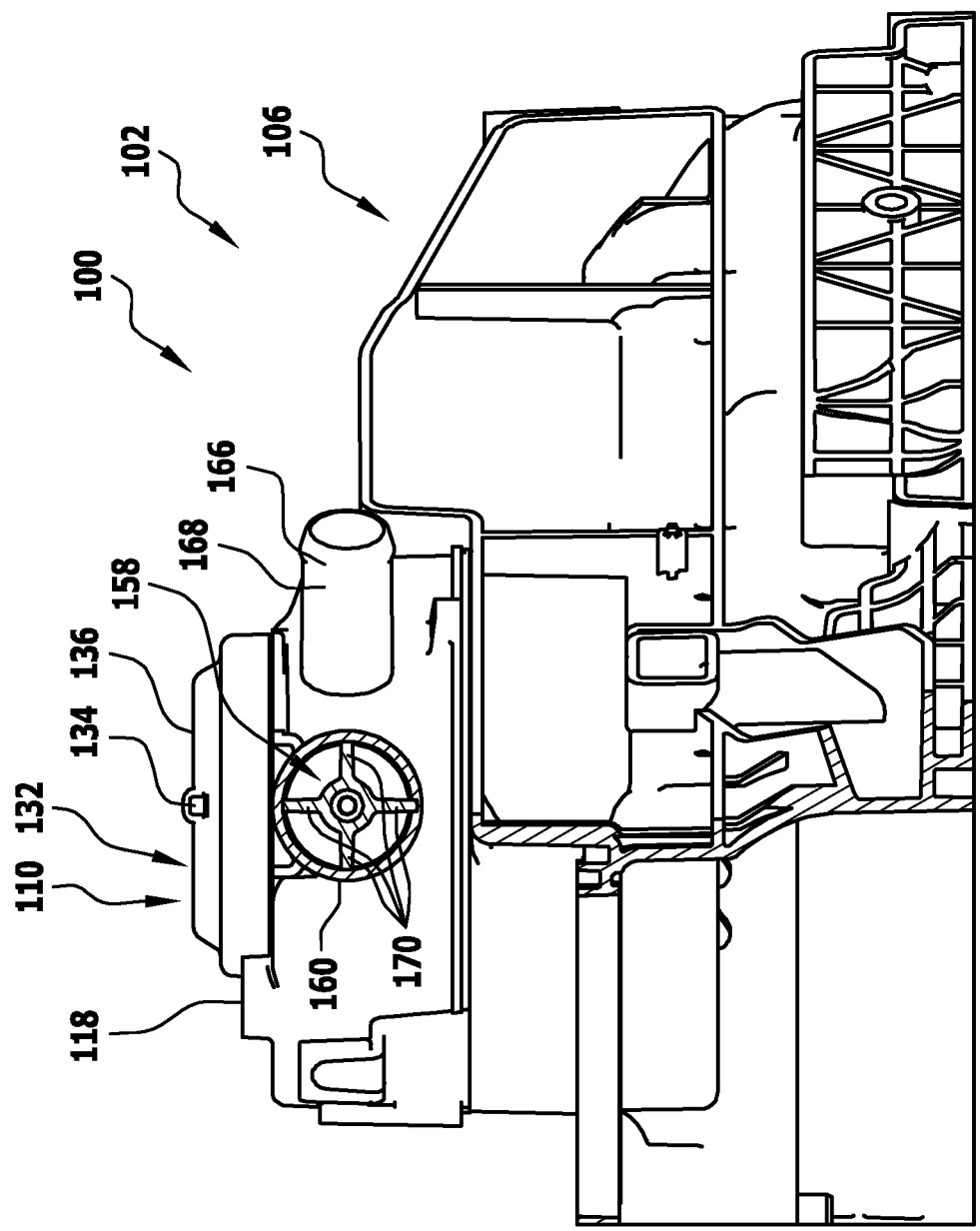
FIG. 10 shows a schematic section along the line 10-10 in FIG. 4.
Figure 11:
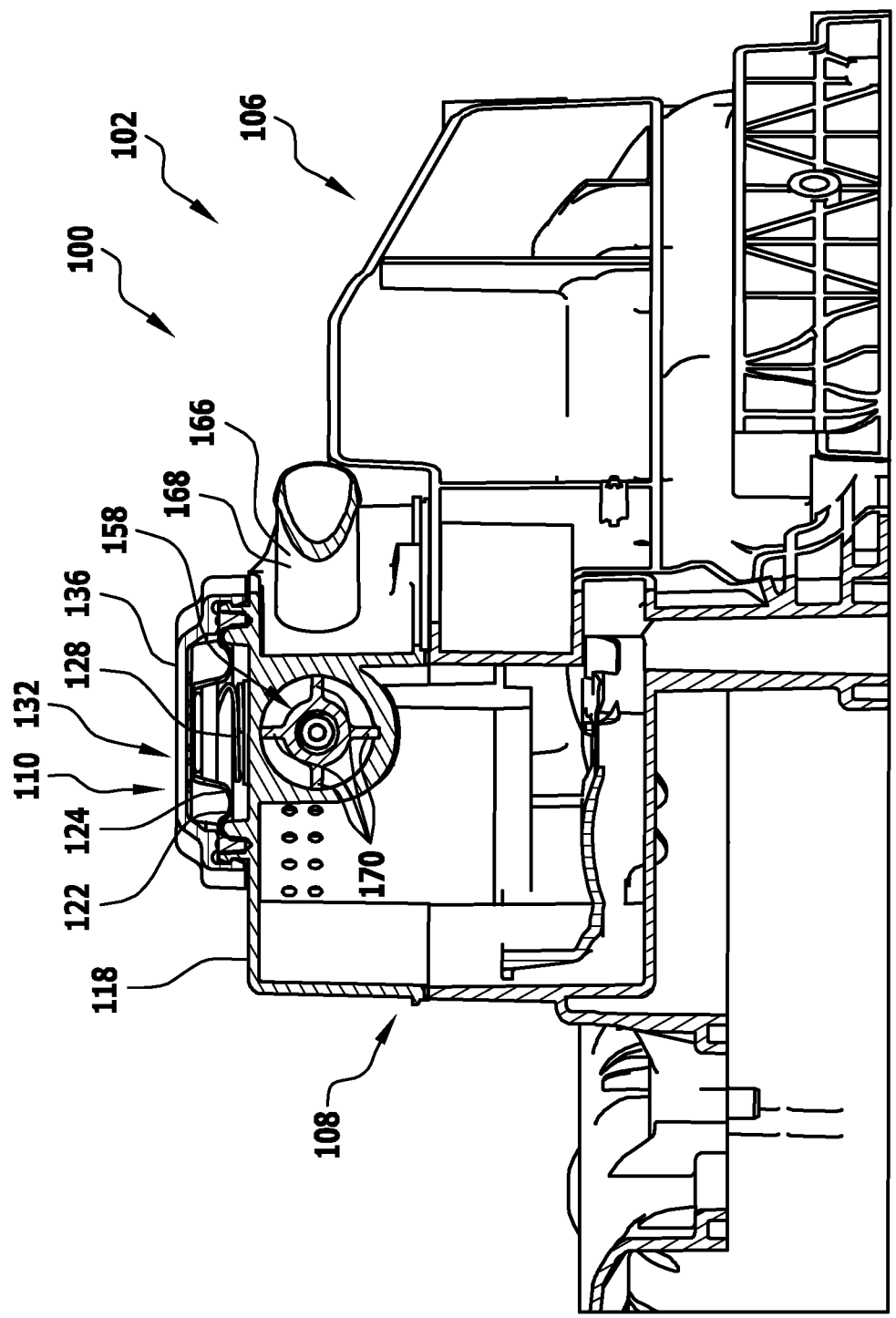
FIG. 11 shows a schematic section along the line 11-11 in FIG. 4.

As may be seen particular in FIG. 6, the valve device 110 is arranged substantially on an outer side of the cover element 118 facing away from the cover body 106.

The pressure-regulating valve cover 136 is thereby in particular fixed on the cover element 118 by means of a clip connection and/or detent connection and/or welding connection.

The nozzle device 138 comprises in particular a suction jet nozzle 140.

The suction jet nozzle 140 comprises in particular a drive nozzle 142, through which a drive medium, for example charge air, is able to be fed.

By means of the drive nozzle 142 and the drive medium fed through the drive nozzle 142, a suction effect may preferably be produced in a suction section 144 of the suction jet nozzle 140.

In particular gas may be drawn up out of the separation device 108 by means of this suction effect.

The gas stream supply 130 preferably flows into the suctions section 144.

The gas stream supply 130 is thereby preferably formed substantially annularly and surrounds the drive nozzle 142.

By means of the gas stream supply 130 and the drive nozzle 142, drive medium, on the one hand, and the gas removed from the separation device 108, on the other hand, may be thus be supplied substantially coaxially to the suction section 144.

The suction section 144 is formed substantially tubularly.

The suction section 144 preferably comprises a section 148 tapering along a flow direction 146, a cylinder section 150, and a section 152 enlarging in the flow direction 146.

The tapering section 148, the cylinder section 150, and the enlarging section 152 are thereby preferably arranged successively in this order along the flow direction 146.

The flow direction 146 is thereby in particular the flow direction 146 of the drive medium, which is supplied to the suction section 144 via the drive nozzle 142, and/or of the gas, which is drawn into the suction section 144 via the gas stream supply 130.

The tapering section 148 has an inner cross section tapering along the flow direction 146. In particular, the tapering section 148 preferably surrounds a truncated-cone-shaped cavity.

The cylinder section 150 preferably has an inner cross section that is substantially constant, for example circular, along the flow direction 146. In particular, the cylinder section 150 preferably surrounds a cylinder-shaped, for example circular-cylinder-shaped, cavity.

The enlarging section 152 preferably has an inner cross section that expands in the flow direction 146. The enlarging section 152 preferably surrounds a truncated-cone-shaped cavity.

By means of the tapering section 148, the cylinder section 150, and the enlarging section 152, a flow taper is in particular formed in the suction section 144, whereby a suction effect of the suction jet nozzle 140 may be produced and/or optimized.

The suction segment 144 is preferably integrated in an outlet connecting piece 154.

The outlet connecting piece 154 is in particular a connection nozzle for connecting a gas-supplying hose, in order to ultimately supply charge air together with removed gas from the oil separator 112 to the combustion chambers of the combustion engine 102.

The suction section 144 is preferably formed bipartite or multipartite.

For example, provision may be made for a radially interior part of the suction section 144 with respect to the flow direction 146, which will subsequently be referred to as radially inner part 156, to be formed as a plastic component, in particular an injection molding plastic component.

The radially inner part 156 is for example an insertion element 158, which in particular is insertable, for example able to be slotted, into a substantially hollow-circular-cylindrical radially outer part 160 of the suction section 144.

The radially outer part 160 of the suction section 144 is preferably a constituent part of the cover body 106 and/or of the cover element 118.

In the embodiment of the cylinder head cover 100 depicted in FIGS. 1 to 11, the radially outer part 160 of the suction section 144 is the outlet connecting piece 154, which is a constituent part of the cover element 118.

A detent device 162 is preferably provided for connecting the radially inner part 156 and the radially outer part 160.

The detent device 162 preferably comprises one or more detent elements 164, by means of which the radially inner part 156 and the radially outer part 160 of the suction section 144 are lockable to each other.

For example, multiple detent elements 164 are formed on the insertion element 158 and are lockable to the radially outer part 160.

The insertion element 158 is in particular able to be slotted against the flow direction 146 into the outer part 160 of the suction section 144.

As may be seen for example in FIG. 1, the drive nozzle 142 and the suction section 144 are integrated into the separation device 108 and into the valve device 110 in such a way that a drive medium connection 166 as well as the outlet connecting piece 154 directly adjoin the separation device 108 and/or the valve device 110, for example run and/or are arranged at least in sections between the separation device 108, on the one hand, and the valve device 110 on the other.

The drive medium connection 166 is thereby in particular a charge air feed connecting piece 168, which, like the outlet connecting piece 154, is preferably formed integrally with the cover element 118.

As may be gathered from FIGS. 2, 3, 10, and 11, the insertion element 158 does not extend solidly outward to the radially outer part 160 of the suction section 144.

Rather, multiple struts 170 are provided for seating the insertion element 158 on the radially outer part 160 of the suction section 144.

The detent elements 164 are preferably extensions of these struts 170.

The cylinder head cover 100 depicted in FIGS. 1 to 11 is preferably thereby simply producible and preferably thereby enables providing a combustion engine 102 with small external dimensions, in that the cylinder head cover 100 comprises other components with additional functions in addition to the cover body 106 with a conventional covering function. These are in particular the separation device 108, the valve device 110, and the nozzle device 138.

Therein that for example the cover element 118 forms parts of the separation device 108 as well as of the valve device 110 and the nozzle device 138, a multitude of functions with the cylinder head cover 100 may be achieved with little manufacturing and production effort.

Therein that the suction section 144 of the nozzle device 138 is formed bipartite, the radially outer part 160 may be formed as a standard outlet connecting piece 154, while the suction-effect-optimizing flow constriction point is created by means of the insertion element 158.

The invention claimed is:

1. A cylinder head cover for a combustion engine, comprising:
   a cover body, which in the assembled state of the cylinder head cover is arranged on an engine block of the combustion engine and covers a cylinder head of the combustion engine;
   a separation device, through which a crude gas stream is able to be fed for the purification thereof, wherein the separation device is formed and/or bound at least in sections by the cover body; and/or
   a valve device, which is formed and/or bound at least in sections by the cover body,
   wherein the cylinder head cover comprises a nozzle device, which is integrated into the separation device and/or into the valve device,
   wherein the nozzle device comprises a suction jet nozzle, by means of which a gas stream may be drawn in and/or removed,
   wherein the suction jet nozzle comprises a drive nozzle and a suction section, into which the drive nozzle of the suction jet nozzle, on the one hand, and a gas stream supply, on the other hand, open out into,
   wherein a drive medium is able to be supplied to the drive nozzle for the production of a suction effect for drawing up the gas stream,
   wherein the drive medium is charge air, and
   wherein the suction section has at least two parts, wherein an inner part with respect to a radial direction is formed by an insertion element, which has a substantially constant outer cross section along a flow direction and a varying inner cross section along a flow direction.

2. The cylinder head cover according to claim 1, wherein the gas stream is the crude gas stream fed through the separation device.

3. The cylinder head cover according to claim 1, wherein the suction section seen along a flow direction comprises a tapering section, a cylinder section, and an enlarging section.

4. The cylinder head cover according to claim 3, wherein the insertion element comprises the tapering section, the cylinder section, and the enlarging section.

5. The cylinder head cover according to claim 1, wherein the suction section and the drive nozzle are arranged at least approximately coaxially to each other.

6. The cylinder head cover according to claim 1, wherein the gas stream supply flows at least approximately annularly into the suction section.

7. The cylinder head cover according to claim 1, wherein the suction section comprises an outer part with respect to a radial direction is formed by a housing component of the separation device and/or by a housing component of the valve device and/or by the cover body.

8. The cylinder head cover according to claim 1, wherein the insertion element comprises a detent device, in particular one or more detent elements, for the fixing thereof on an outer part of the at least bipartite suction section.

9. The cylinder head cover according to claim 1, wherein the cover body, a cover element of the separation device, a cover element of the valve device, a suction section of the nozzle device, and/or a drive nozzle of the nozzle device are formed by one or more plastic components, in particular injection molding plastic components.

10. The cylinder head cover according to claim 1, wherein the valve device comprises a pressure-regulating valve, by means of which a volumetric flow of the gas stream to be removed via the nozzle device is able to be regulated.

11. The cylinder head cover according to claim 1, wherein the separation device comprises one or more separation chambers, which are bound by the cover body and a cover element of the separation device, wherein the cover body and/or the cover element are each integrally formed and form and/or bound the following in addition to the one or more separation chambers:
   at least one valve chamber for receiving a valve element of the valve device; and/or
   a gas stream supply of the nozzle device; and/or
   a drive nozzle of the nozzle device; and/or
   a drive medium connection of the nozzle device; and/or
   an outlet connecting piece for removing the drive medium and/or the gas stream.

12. A cylinder head cover for a combustion engine, comprising:
   a cover body, which in the assembled state of the cylinder head cover is arranged on an engine block of the combustion engine and covers a cylinder head of the combustion engine;
   a separation device, through which a crude gas stream is able to be fed for the purification thereof, wherein the separation device is formed and/or bound at least in sections by the cover body; and/or
   a valve device, which is formed and/or bound at least in sections by the cover body,
   wherein the cylinder head cover comprises a nozzle device, which is integrated into the separation device and/or into the valve device,
   wherein the nozzle device comprises a suction jet nozzle, by means of which a gas stream may be drawn in and/or removed,
   wherein the suction jet nozzle comprises a drive nozzle and a suction section, into which the drive nozzle of the suction jet nozzle, on the one hand, and a gas stream supply, on the other hand, open out into,
   wherein the suction section has at least two parts, wherein an inner part with respect to a radial direction is formed by an insertion element, which has a substantially constant outer cross section along a flow direction and a varying inner cross section along a flow direction,
   wherein the suction section seen along a flow direction comprises a tapering section, a cylinder section, and an enlarging section,
   wherein the insertion element comprises the tapering section, the cylinder section, and the enlarging section.

13. A cylinder head cover for a combustion engine, comprising:
   a cover body, which in the assembled state of the cylinder head cover is arranged on an engine block of the combustion engine and covers a cylinder head of the combustion engine;

a separation device, through which a crude gas stream is able to be fed for the purification thereof, wherein the separation device is formed and/or bound at least in sections by the cover body; and/or a valve device, which is formed and/or bound at least in sections by the cover body, wherein the cylinder head cover comprises a nozzle device, which is integrated into the separation device and/or into the valve device, wherein the nozzle device comprises a suction jet nozzle, by means of which a gas stream may be drawn in and/or removed, wherein the suction jet nozzle comprises a drive nozzle and a suction section, into which the drive nozzle of the suction jet nozzle, on the one hand, and a gas stream supply, on the other hand, open out into, wherein the suction section has at least two parts, wherein the suction section comprises an inner part with respect to a radial direction which is formed by an insertion element, which has a substantially constant outer cross section along a flow direction and a varying inner cross section along a flow direction, wherein the suction section further comprises an outer part with respect to the radial direction.

14. The cylinder head cover according to claim 13, wherein the inner part and the outer part are connectable to each other by means of a detent connection and/or a clip connection.

\* \* \* \* \*